Nov. 11, 1941.   M. E. REAGAN   2,262,651
PROTECTIVE SYSTEM FOR ELECTRICAL MACHINES
Filed Nov. 16, 1938
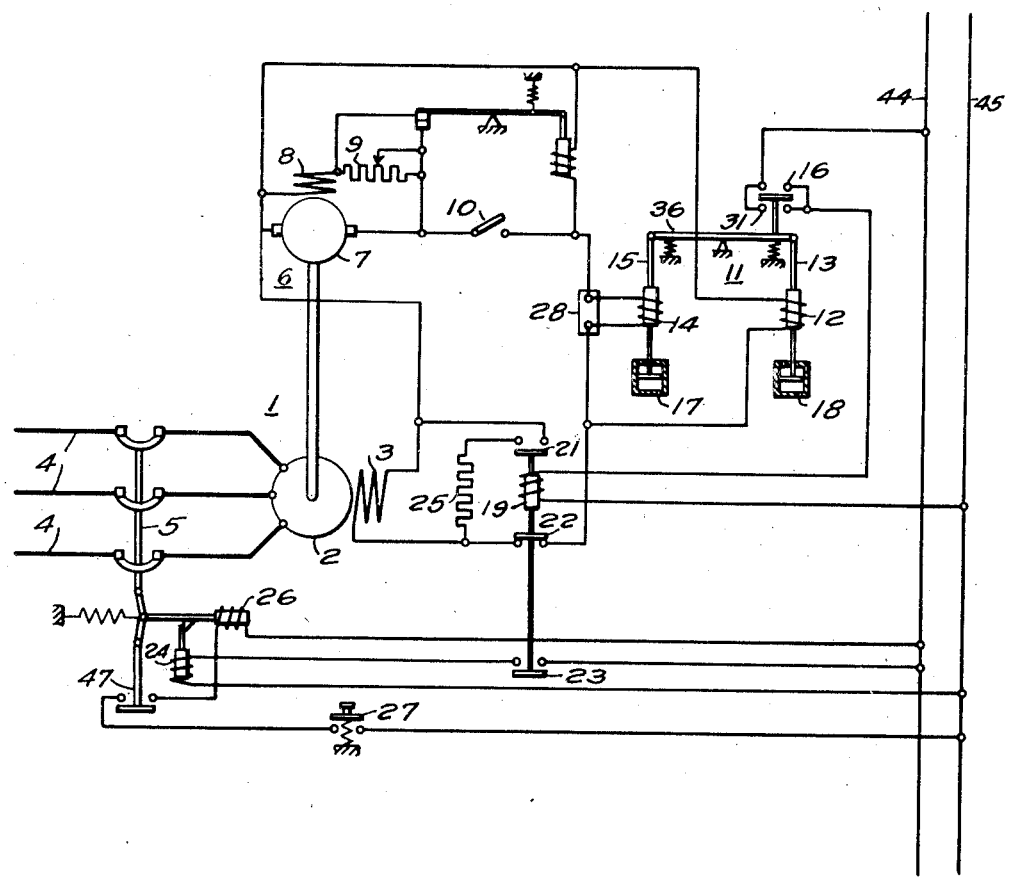
WITNESSES:   INVENTOR
  Maurice E. Reagan.
  BY
  ATTORNEY Patented Nov. 11, 1941

2,262,651

UNITED STATES PATENT OFFICE 2,262,651

PROTECTIVE SYSTEM FOR ELECTRICAL MACHINES

Maurice E. Reagan, Pittsburgh, Pa., assignor to Westinghouse Electric & Manufacturing Company, East Pittsburgh, Pa., a corporation of Pennsylvania Application November 16, 1938, Serial No. 240,682

9 Claims. (Cl. 175—294)

My invention, in general, relates to protective systems, and in particular, to protective systems for the field or excitation windings of electrical machines.

In automatically controlled sub-stations and the like where no attendant is usually employed, it is highly expedient to protect the electrical machines in such sub-stations against trouble of all kinds. It has been the usual practice in the past to protect the armature windings of electrical machines against short circuits, or other faults, by a system of protective relays which functions to disconnect the machine from the power source when any trouble occurs in the armature winding. I have found that it is equally desirable to provide for further protecting such machines against a fault or failure of their field or excitation windings.

The object of my invention, generally stated, is to provide for disconnecting an electrical machine such as a motor, generator, rotary converter, synchronous condenser or the like, from its associated source of power when a fault occurs in the field or excitation winding of such machine.

A more specific object of my invention is to provide for utilizing a differential relay connected to be responsive to a substantial change in the resistance of the field or excitation winding of an electrical machine to disconnect the machine from the source of power to which it may be connected.

A further object of my invention is to provide for disconnecting an electrical machine from a source of power in response to a predetermined unbalance between the voltage of its source of excitation and its normal field excitation current such as may occur as the result of a fault in the field or excitation winding of the machine.

Another object of my invention is to provide a protective system for an electrical machine having a direct connected exciter in which a differential relay jointly responsive to the voltage of the exciter and the excitation current of the machine is utilized to disconnect the machine from a power source or the field or excitation winding from the exciter, or both, in response to the occurrence of a fault in the field or excitation winding of the machine.

For a more complete understanding of the nature and scope of my invention, reference may be had to the detailed description to follow, taken in conjunction with the drawing, in which the single figure is a diagrammatic view of one embodiment of my invention.

With reference to the drawing, reference character 1 designates an electrical machine having an armature 2 and a separately-excited field winding 3. The machine may be connected to a source of power 4 by a circuit breaker 5 of a well-known type. In order to provide for energizing the field winding 3 of the machine 1, any suitable source of excitation may be used, such for example, as a direct connected exciter 6 which may be a direct current generator of the shunt type having an armature 7 and a field winding 8. A voltage regulator 9 may be used, if desired, in conjunction with the exciter 6 for maintaining the voltage of the exciter at a substantially constant predetermined value. A manual switch 10 may be provided in the field circuit of the machine 1.

My protective system comprises a differential relay 11 which, while balanced for normal conditions of the field circuit, becomes unbalanced when a fault occurs in the field winding and effects the operation of other devices for disconnecting the field winding and removing the machine from service such as by disconnecting it from the power source. This differential relay 11 may be of the balanced arm type as shown; however, I do not wish to be restricted to this type of differential relay as it is evident that other types of relays having differentially related windings may be used to attain the same result without departing from the teachings of my invention. The relay is provided with a winding 12 which is energized in accordance with the voltage of the exciter 6 and functions to actuate its associated armature 13 downwardly when the relay becomes unbalanced in a manner hereinafter described. The relay is provided with a second winding 14 energized in accordance with the field excitation current of the machine through a shunt 28 connected in the field circuit and functions to actuate its associated armature 15 downwardly when the relay becomes unbalanced under certain conditions to be described hereinafter.

It is well known that the resistance of the field winding 3 of the machine 1 may vary while the machine is in operation due to changes in the temperature of the winding. With the output voltage of the exciter 6 maintained at substantially a constant predetermined value, by the voltage regulator 9, it will be apparent that the current in the field winding will also vary with the variations in its resistance. However, windings 12 and 14 are so designed that for the normal changes of current flowing to the field winding 3 produced by the normal changes in field resistance, the ampere turns of the coil 14 will remain substantially balanced by the ampere turns of the coil 12. Since the ampere turns of each winding are substantially equal, the pull on the armatures 13 and 15 will be substantially equal and there will be no movement of these armature members 13 and 15, leaving the beam 36 of the differential relay in a balanced neutral position with the contact members 16 and 31 open, as shown.

Although the voltage regulator 9 is used in conjunction with the exciter 6, small variations in output voltage of the exciter may possibly occur. Under normal conditions of the resistance of the field winding 3, such variations will not, however, cause the relay 11 to become unbalanced to any appreciable extent.

Should the output voltage of the exciter vary for any reason under normal conditions of field winding resistance values, there will be corresponding proportionate changes in the current supplied to the windings 12 and 14 of the relay 11. However, the ampere turns of these windings will also vary in the same proportions and the armatures 13 and 15 and beam 36 will remain in their balanced neutral position.

It will be apparent that due to the characteristics of the field winding 3, such changes in field current and hence the changes in current in the winding 14 resulting from any fluctuation in exciter output voltage will in point of time lag behind the changes in current in the winding 12 produced by such exciter voltage fluctuation.

To prevent unbalancing of the relay 11 under these conditions, I have provided dashpots 17 and 18 which provide sufficient time delay to allow the changes of current in the windings 12 and 14 to become equalized. While I prefer to use dashpots it will be evident that other types of time delay may be used to effect the same result.

As an example of a type of fault in the field winding 3 respecting which my protective system will function to disconnect the machine 1 from the source 4, let us assume that one or more coils of the field winding 3 become "short-circuited" resulting in a substantial decrease in the resistance of the field winding. Since the output voltage of the exciter remains unchanged under the "short-circuit" conditions in the field winding due to the functioning of the voltage regulator 9, it is apparent that there will be a resultant increase in current in the field winding 3. This increase in current will likewise produce an increase in current in the winding 14 of the relay 11 and hence an increase in ampere turns of coil 14. The increase of ampere turns will unbalance the relay 11 and actuate the armature member 15 to move in a downwardly direction. It is evident that such a movement of the member 15 will cause the portion of the beam member 36 which carries the movable contact element to move upwardly and bridge contact members 16.

The closure of contact members 16 establishes an energizing circuit for the winding of relay 19 from a current source, which may be illustrated by the conductors 44 and 45. When the winding of relay 19 is energized, it actuates its armature in an upward direction to close contact members 21 and 23, and open contact members 22. Opening of the contact members 22 interrupts the energizing circuit of the field winding 3 of the machine 1. The closure of contact members 23 energizes the trip coil 24 to effect the opening of the circuit breaker 5 which disconnects the machine 1 from the source 4. When the breaker 5 moves to its open position, its auxiliary contact members 47 close to prepare an operating circuit for its closing coil 26 which may be completed by the switch 27 to again close the breaker.

When the contact members 21 are closed by the upward movement of the armature of relay 19, a resistor 25 is connected across the field winding 3 to discharge the energy of the field.

I do not wish to be limited to the type of circuit breaker which has been described herein as it will be apparent to those skilled in the art that other types of circuit breakers or other disconnecting means may be used in lieu of the embodiment as shown to disconnect the machine 1 and field 3 without departing from the scope of my invention.

Should faults such as a complete open circuit or a partial open circuit occur in the field winding 3, resulting in a substantial increase in the resistance thereof, the current in the field circuit will be reduced to a zero or near zero value. Such a current reduction effects a reduction in the amount of current flowing in winding 14 of the differential relay 11, causing the relay 11 to become unbalanced and the armature 13 of winding 12 to actuate its associated armature 13 in a downward direction to effect a closure of contact members 31. When contact members 31 are closed, the winding on relay 19 is energized from the source 44—45, causing the armature of relay 19 to be actuated as described hereinbefore. The operation of relay 19 effects the disconnection of the field winding 3 from the exciter 6 and the machine from the source 4.

It will be evident from the foregoing description that I have provided a simple and effective system for disconnecting a machine from its associated power source when faults such as "short-circuits" or "open circuits" occur in the field or excitation winding thereof. It is also evident that modifications and changes may be made therein without departing from the spirit and scope of my invention, and I desire, therefore, that only those limitations shall be placed thereon as are required by the prior art.

I claim as my invention:

1. A protective system for disconnecting an electrical machine from a connected power source upon a substantial change in the resistance of the field winding thereof comprising a differential relay having an operating coil responsive to the potential applied to said field winding and an operating coil responsive to the current flowing in said field winding, said relay being operable when the resistance value of said winding exceeds the normal maximum value or is diminished below the normal minimum value, and means responsive to said relay operation for disconnecting said machine from the power source.

2. The combination with electrical apparatus operable from a power source and having an excitation winding as an element thereof, of a protective system for said apparatus comprising a normally balanced differential relay having an operating coil responsive to the voltage applied to said excitation winding and another operating coil responsive to the current supplied to said excitation winding, said relay being operable to an unbalanced position either upon short-circuit or open-circuit conditions of said excitation winding, and means responsive to the operation of said relay to said unbalanced position operable to disconnect said electrical apparatus from said power source.

3. The combination with electrical apparatus having an excitation winding as an element thereof and an energizing source therefor, of a protective system for said apparatus comprising a differential relay balanced under normal conditions of circuit resistance of said winding having an operating coil responsive to the voltage supplied to said winding and an operating coil responsive to the current supplied through said winding, said relay being operable to an unbalanced position in one direction when the resistance value of said winding exceeds the normal maximum value and in an opposite direction when said resistance diminishes below the normal minimum value, and means responsive to the operation of said relay to either of its unbalanced positions operable to disconnect said winding from said energizing source.

4. A protective system for disconnecting an electrical machine from a connected power source upon a substantial change in the resistance of the field winding thereof comprising, a normally balanced differential relay having an operating coil responsive to the potential applied to said field winding and an operating coil responsive to the current supplied to said field winding, said relay being operable in an unbalanced position when the resistance value of said winding exceeds the normal maximum value or is diminished below a normal minimum value, and means operable when said relay has moved to its unbalanced position to disconnect said machine from said power source.

5. The combination with an electrical machine operable from a power source and having an exciter for supplying current to the field winding of said machine, of a protective system therefor comprising a differential relay having an operating coil responsive to the output voltage of said exciter and an operating coil responsive to the field excitation current of the machine, said relay being balanced under normal conditions of field resistance but operable to an unbalanced position under short-circuit or open-circuit conditions of said field winding, and means operable when said relay has moved to its unbalanced position for disconnecting said machine from said power source.

6. In combination, an electrical machine having a field winding, a source of excitation current for said field winding, a circuit breaker for connecting said machine to a power source, and a protective system for said machine comprising a differential relay balanced to a neutral position under normal operating values of field resistance having an operating coil responsive to the voltage of said source of excitation current and an operating coil responsive to said excitation current, said relay being operable to an unbalanced position when the resistance of said field winding either exceeds a normal maximum value or diminishes below a normal minimum value, and means responsive to said relay operation for operating said circuit breaker to disconnect said machine from said power source.

7. In combination, an electrical machine having a field winding and an exciter associated therewith for supplying current to the field winding of said machine, a protective system comprising a differential relay having an operating coil responsive to the output voltage of said exciter and an operating coil responsive to the current supplied to said field winding, said relay being balanced and inoperative throughout the normal operating values of resistance of said field winding but operable to an unbalanced position when the resistance of said field winding exceeds the normal maximum or diminishes below a normal minimum value, and means operable when said relay has moved to its unbalanced position for disconnecting said electrical machine from its source of power.

8. The combination with an electrical machine including a power source therefor and having an exciter associated therewith for supplying excitation current to the field winding of said machine, of a protective system comprising, a normally balanced differential relay having an operating coil responsive to the output voltage of said exciter, and an operating coil responsive to the current in said field winding, said relay being operable to an unbalanced position in one direction when the resistance of said field winding exceeds the normal maximum value and operable to an unbalanced position in another direction when the resistance of said field winding diminishes below its normal minimum value, time delay means operatively connected to said relay, and means responsive when said relay is in either of its unbalanced positions for disconnecting said electrical machine from said power source.

9. The combination with an electrical machine, an associated power source therefor, an exciter for supplying excitation current to the field winding of said machine and means for regulating the output voltage of said exciter, of a protective system comprising, a normally balanced differential relay having an operating coil responsive to the output voltage of said exciter, and an operating coil responsive to the current in said field winding, said relay being operable to an unbalanced position in one direction when the resistance of said field winding exceeds the normal maximum value and operable to an unbalanced position in another direction when the resistance of said field winding diminishes below its normal minimum value, time delay means operatively connected to said relay, and means responsive when said relay is in either of its unbalanced positions for disconnecting said electrical machine from said power source.

MAURICE E. REAGAN.